(12) United States Patent
Zhu et al.

(10) Patent No.: US 10,901,604 B2
(45) Date of Patent: Jan. 26, 2021

(54) TRANSFORMATION OF DATA OBJECT BASED ON CONTEXT

(71) Applicant: Microsoft Technology Licensing, LLC, Redmond, WA (US)

(72) Inventors: Yibing Zhu, Woodinville, WA (US); Seth Fox, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 15/824,325

(22) Filed: Nov. 28, 2017

(65) Prior Publication Data

US 2019/0163339 A1  May 30, 2019

(51) Int. Cl.

| | |
|---|---|
| *G06F 3/048* | (2013.01) |
| *G06F 3/0486* | (2013.01) |
| *G06F 3/0482* | (2013.01) |
| *G06F 16/25* | (2019.01) |
| *G06F 40/14* | (2020.01) |
| *G06F 40/30* | (2020.01) |
| *G06F 40/106* | (2020.01) |
| *G06F 40/166* | (2020.01) |

(52) U.S. Cl.
CPC .......... *G06F 3/0486* (2013.01); *G06F 3/0482* (2013.01); *G06F 16/258* (2019.01); *G06F 40/106* (2020.01); *G06F 40/14* (2020.01); *G06F 40/166* (2020.01); *G06F 40/30* (2020.01)

(58) Field of Classification Search
CPC .. G06F 3/0486; G06F 17/2247; G06F 17/212; G06F 17/2785; G06F 40/106; G06F 40/166; G06F 16/258; G06F 3/0482; G06F 40/30; G06F 40/14; G06F 3/04842; G06F 40/253
See application file for complete search history.

(56) References Cited

U.S. PATENT DOCUMENTS

| | | |
|---|---|---|
| 7,877,701 B2 | 1/2011 | Cohen et al. |
| 8,949,729 B2 | 2/2015 | Bastide et al. |
| 9,092,121 B2 | 7/2015 | Albouyeh et al. |

(Continued)

OTHER PUBLICATIONS

Video tutorials for outlook 2013, Chap 08 01 Import and export vCards to outlook contacts, Apr. 16, 2016, https://www.youtube.com/watch?v=fXEvdsASHQ4.*

(Continued)

*Primary Examiner* — Mohamed Abou El Seoud

(57) ABSTRACT

Non-limiting examples described herein relate to dynamic and intelligent transformation of a data object to a form that fits a context of a content portion in a receiving application/service. As an example, action(s), such as a drag and drop, is received through a user interface of a productivity service. The drag and drop drags a data object onto a content portion of a digital document. A context for the drag and drop is determined based on semantic analysis of the drag and drop. A composite data object is generated based on the determined context of the drag and drop. The composite data object comprises the content portion and a representation of the data object that alters presentation of the data object to fit a context of the content portion. The composite data object may be surfaced through the user interface.

20 Claims, 9 Drawing Sheets

(56) References Cited

U.S. PATENT DOCUMENTS

| | | | |
|---|---|---|---|
| 2007/0035745 A1* | 2/2007 | Izumi | G06F 17/211 |
| | | | 358/1.1 |
| 2008/0201656 A1 | 8/2008 | Kim et al. | |
| 2008/0222548 A1 | 9/2008 | Cohen et al. | |
| 2008/0313011 A1* | 12/2008 | Rose | G06Q 30/02 |
| | | | 705/7.32 |
| 2009/0100342 A1 | 4/2009 | Jakobson | |
| 2010/0211860 A1 | 8/2010 | O'dell-alexander | |
| 2012/0084689 A1* | 4/2012 | Ledet | G06F 3/0486 |
| | | | 715/769 |
| 2014/0267130 A1* | 9/2014 | Hwang | G06F 3/0488 |
| | | | 345/174 |
| 2016/0077673 A1 | 3/2016 | Nagaralu et al. | |
| 2017/0220359 A1 | 8/2017 | Aguilar-aamez et al. | |

OTHER PUBLICATIONS

Lee, Kevin, "How to Insert a Google Map into Microsoft Word", Retrieved From <<https://web.archive.org/web/20170711161619/http:/smallbusiness.chron.com/insert-google-map-microsoft-word-45189.html>> Jul. 11, 2017, 3 Pages.

Alexandria, "Pasting Options in MS Word 2010 (Eliminate Frustrations Associated with Copying from Another Source and Pasting in MS Word) | Speakeasy Solutions Blog", Retrieved from http://www.speakeasysolutions.com/blog/2011/05/24/pasting-options-in-ms-word-2010-eliminate-frustrations-associated-with-copying-from-another-source-and-pasting-in-ms-word/, May 24, 2011, 6 Pages.

"International Search Report and Written Opinion Issued in PCT Application No. PCT/US2018/060211", dated Feb. 25, 2019, 11 Pages.

\* cited by examiner

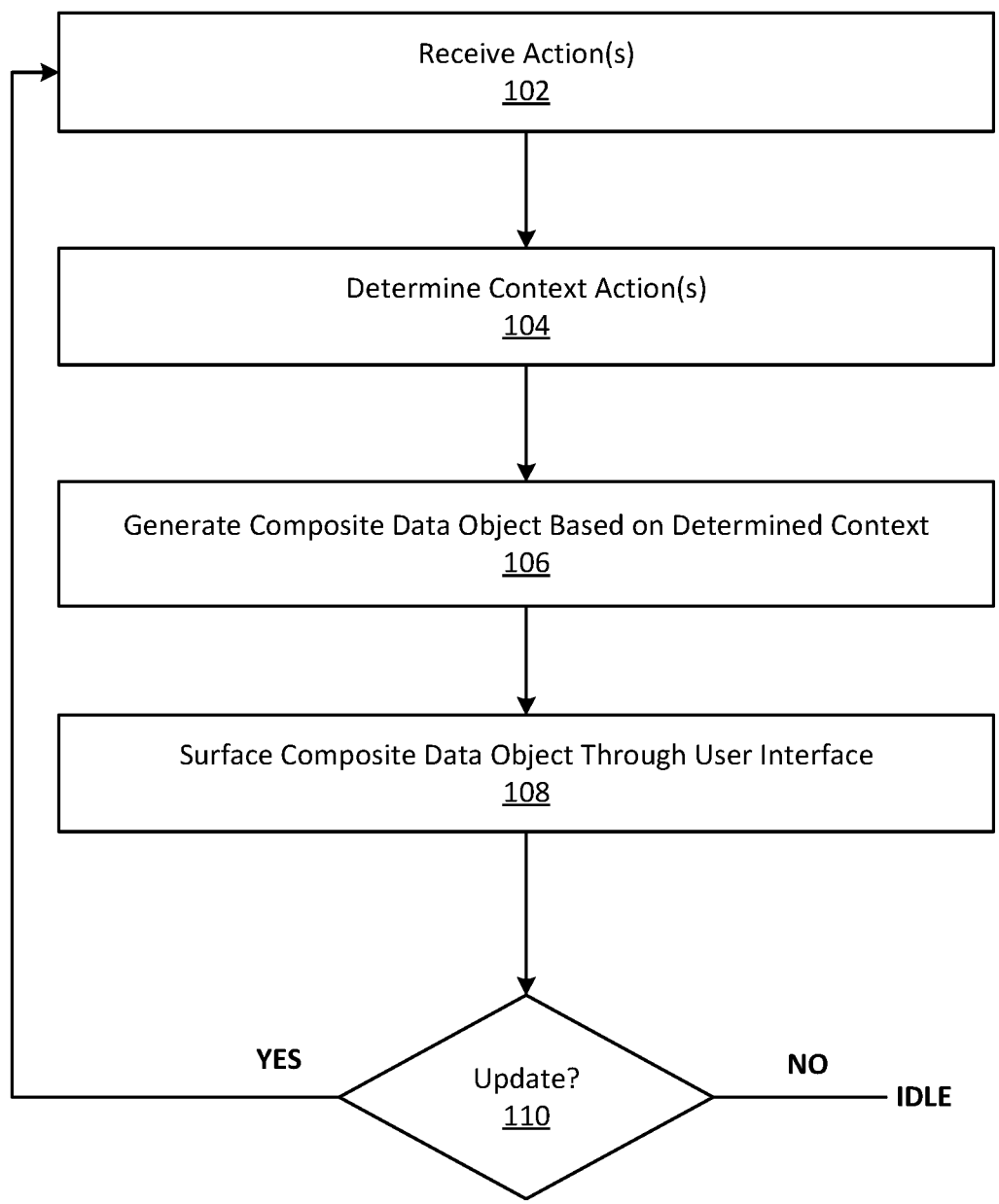

FIG. 2A

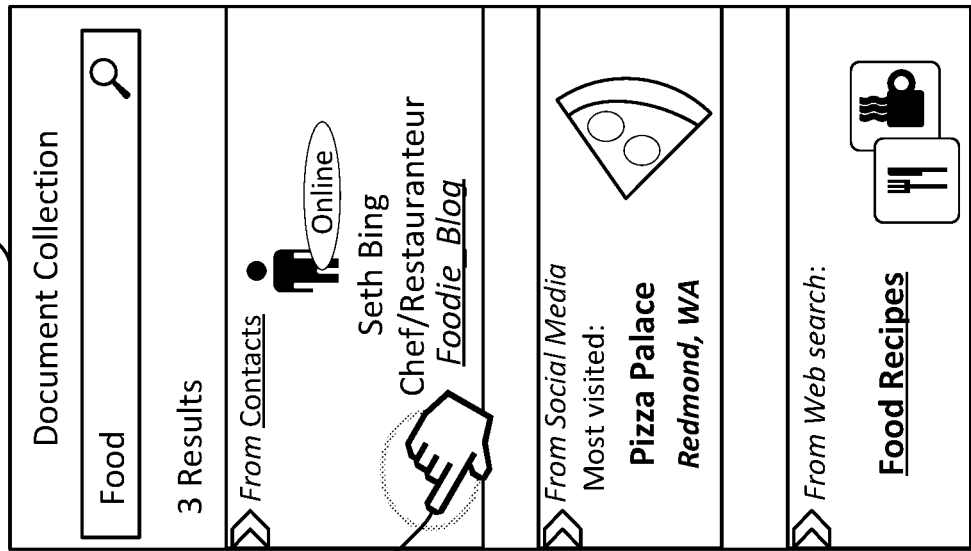
FIG. 2B

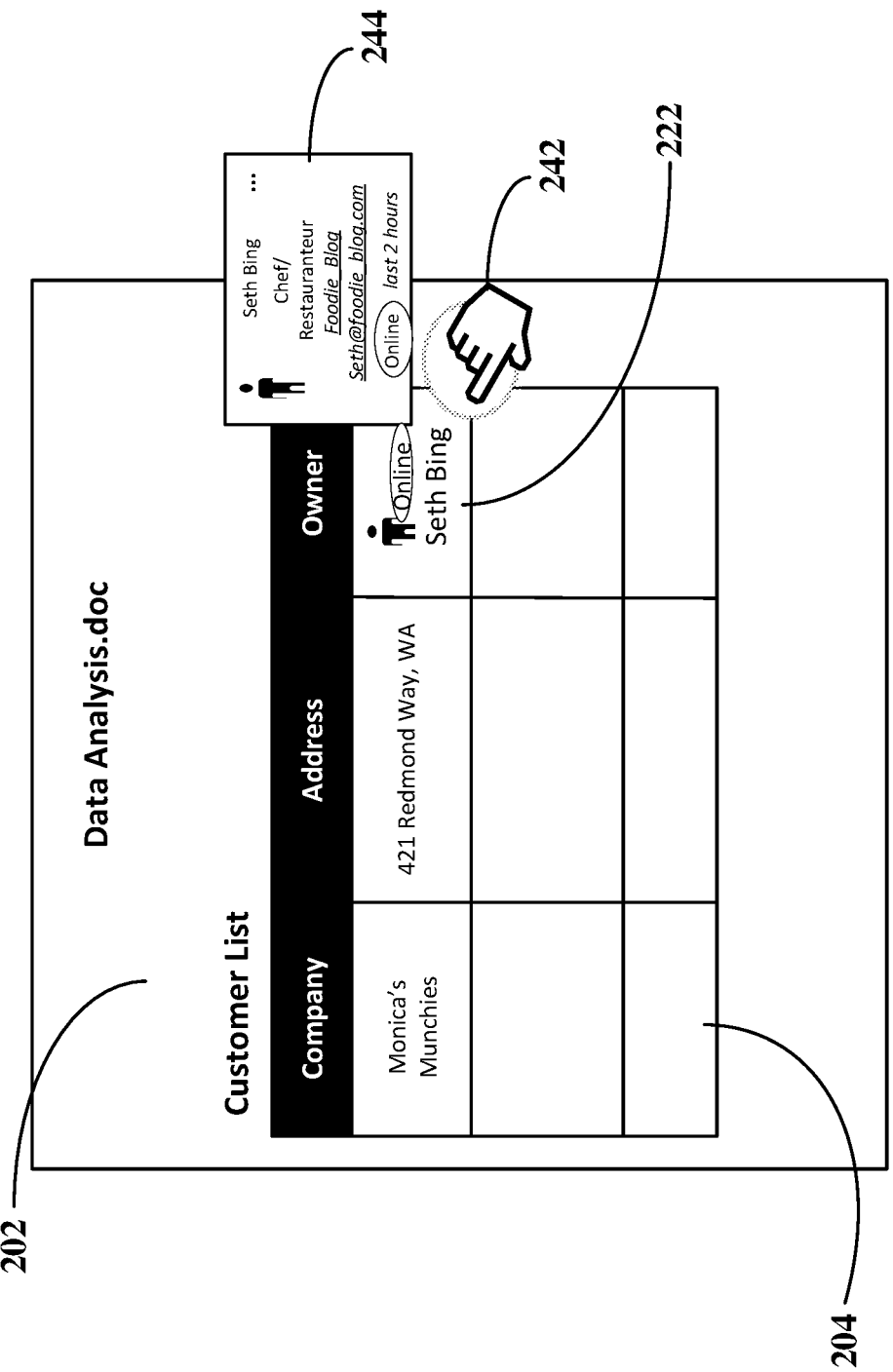

TRANSFORMATION OF DATA OBJECT BASED ON CONTEXT

BACKGROUND

Presently, applications/services are configured to enable manual copy and paste or drag and drop of content across other applications/services. To accomplish such actions, users must manually specify specific content and formatting that is desired in the sending and receiving applications/services. This may be time and labor intensive (e.g. manually typing and entering each component of a contact card). As part of this process, multiple processing operations may occur to add/remove content to fit within a receiving application/service. Further, when such operations are executed, richness of the content object is typically lost. For instance, if a copy and paste operation is executed on an electronic contact card to a word processing document, specific content may be selected from that electronic contact card but all interaction with the electronic contact card is lost on the paste operation.

SUMMARY

Non-limiting examples described herein relate to dynamic and intelligent transformation of a data object to a form that fits a context of a content portion in a receiving application/service. Processing operations described herein enable data objects to be moved between different content portions and/or applications/services, where the data objects may be modified to fit a context of a content portion of an application/service that is receiving the data object. Examples described herein pertain to a receiving action, which may comprise but are not limited to: drag and drop actions, copy and paste actions, selection actions, voice command operations, handwritten input operations, among other examples. For ease of explanation and understanding, non-limiting examples related to drag and drop (e.g. drag and drop actions) are subsequently provided.

As an example, actions, such as a drag and drop, is received through a user interface of a productivity service. The drag and drop drags a data object onto a content portion of a digital document. A context for the drag and drop is determined based on semantic analysis of the drag and drop action. Semantic analysis of the drag and drop comprises evaluation of: data associated with the content portion, data associated with the data object and relationships between the content portion and the data object. A composite data object is generated based on the determined context of the drag and drop. The composite data object comprises the content portion and a representation of the data object that alters presentation of the complex data object. Generation of the representation of the data object comprises: selecting specific content of the data object to surface in the representation of the composite data object based on the determined context. Further, formatting and layout of the specific content may be selected based on the determined context. The representation of the data object may be generated based on a selection of the specific content and a selection of the formatting and layout of the specific content. The representation of the data object may be merged with the content portion to generate the composite data object. The composite data object may be surfaced through the user interface.

In further examples, the representation of the data object may be involved in a subsequent action such as a drag and drop. Processing described herein may again modify the representation of the data object to fit a context for a new context portion that is receiving the representation, which may comprise recovering a formatting of the data object and/or selecting content of the data object to surface in a newly created composite data object.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 1 illustrates an exemplary method related to transformation of a data object for a context of digital document with which aspects of the present disclosure may be practiced.

Figure 2A:
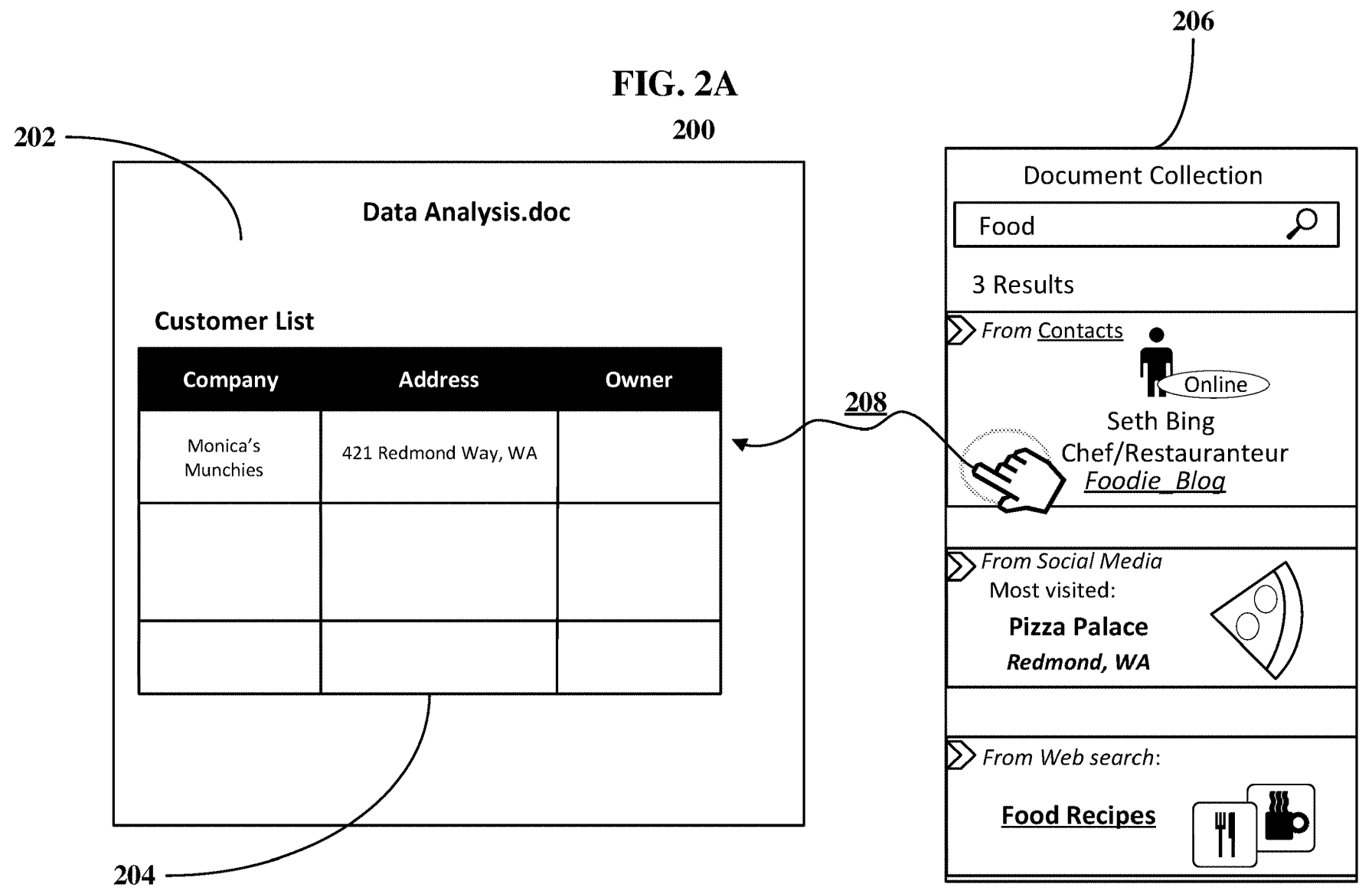

FIGS. 2A-2D illustrate exemplary processing device views associated with transformation of a data object with which aspects of the present disclosure may be practiced.

DETAILED DESCRIPTION

Figure 2D:
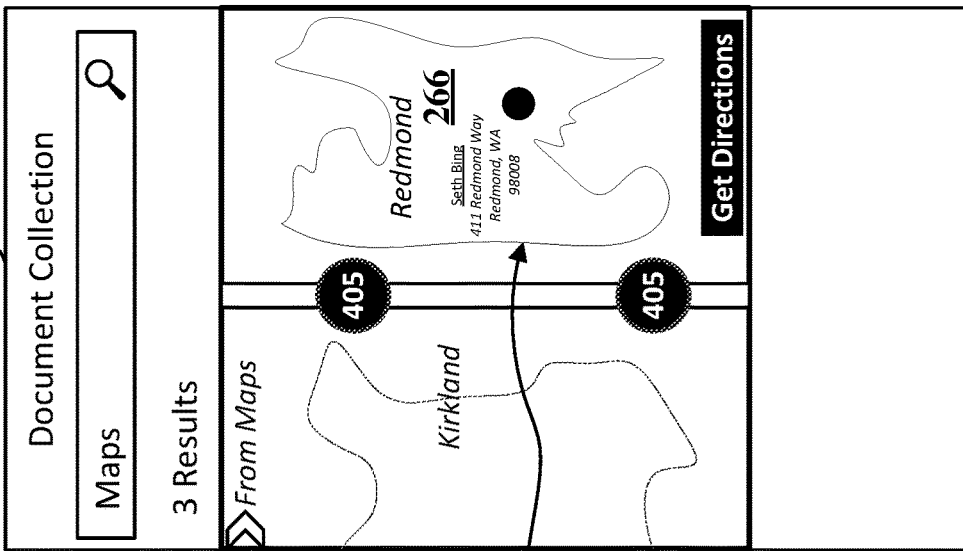

Non-limiting examples described herein relate to dynamic and intelligent transformation of a data object to a form that fits a context of a content portion in a receiving application/service. Processing operations described herein enable data objects to be moved between different content portions and/or applications/services, where the data objects may be modified to fit a context of a content portion of an application/service that is receiving the data object. As an example, processing operations may be applied to received actions such as a drag and drop actions. However, examples described herein are not so limited and may apply to any type of processing action including but not limited to copy/paste operations, selection actions, voice command operations, handwritten input operations, among other examples. For ease of explanation and understanding, examples for drag and drop are provided herein.

Examples of the present disclosure extend to processing actions that transform one or more data objects into a different state to generate a complex data object in a receiving application/service. Signals collected and analyzed from the data object and a context of a digital document are utilized to determine a best representation of the data object for insertion into a digital document. For instance, a data object may be inserted into a specific portion of a digital document, where an exemplary composite data object may be created that tailors the data object for insertion into the content portion of the digital document. As an example, a data object may be a complex data object that comprises two or more data field entries in a rich data format. For instance, examples of complex data objects comprise but are not limited to: electronic contact cards, profiles (e.g. user, business, locations, etc.), grouped/layered objects, etc. Exemplary complex data objects may further comprise data types such as hyperlinks, handwritten input data voice/audio data, and video data, among other examples.

A composite data object may comprise the transferred data object (or objects) and at least one content portion in a receiving application/service. In some cases, composite data objects may be created for content portions of the same application/service but may also extend to examples where one or more data objects are transferred from one application/service to a different application/service. Content and formatting of a data object may be transformed based on analysis of a context associated with a processing action. For example, processing operations may be executed to evaluate: the data object being transferred, a digital document in which is receiving the data object (e.g. content portion of the digital document), and relationships between the data object and a content portion of the digital document, among other examples. Data associated with the content portion can include the specific area where the content is dropped (e.g. understanding the surrounding paragraph or semantics of a table), the type of document (e.g. resume, bid document), the location of the document, work vs. personal, and pattern of use (e.g. signal processing evaluating user behaviors), among other examples. The most appropriate layout and formatting may be chosen based on the context of the processing action. For instance, contextual analysis of an action (and associated data) may yield a determination to manipulate a data object between a rich data representation and a flat data representation. As an example, an electronic contact card may be dragged and dropped into an electronic table (e.g. content portion) of a word processing document, where the electronic content card is transformed into a data object in an email address form based on a table column heading (e.g. "email address") of the electronic table. The data object may optionally retain the interactive electronic contact card formatting (e.g. rich data format), for example, when a user hovers-over, scrolls-over or selects the data object (e.g. email address). In further examples, semantic evaluation of an action(s) (e.g. context of the action) may yield a determination to autofill multiple portions of a digital document (e.g. fill an entire row/column of an electronic table).

Further, semantic evaluation of an exemplary action may further be configured with a default fallback for insertion behavior. An exemplary model may be configured to collect and evaluate signal data to determine an exemplary context of an action. In some cases, signal data indicating specifics of a context for a digital document may be unavailable or not enough data is collected to make a proper determination. In such instances, an exemplary model may be configured to determine how to modify a data object based on broader trends (e.g. document name, location, previous usage patterns of user and/or aggregate users, etc.). An exemplary model applied for semantic analysis of an action may be programmable (by developers) as well as adaptable (learning model), where the model may learn from signal data collected.

Further, transformation of the data object enables recovery and adjustment of inserted content/data objects, where rich data formats may be retained despite a representation of the data object where the layout and formatting has been visibly altered. For example, a generated composite data object may comprise a first representation of a transferred data object that initially displays content that fits a context of the receiving application/service and a different composite data object may comprise a second representation of the transferred data object that alters the data object for a context associated with a different content portion/digital document, etc. In some examples, an exemplary user interface of a productivity service is configured to surface additional content of a data object based on subsequent actions such as hover-over actions, scroll-over actions, selection actions, etc. For example, a user interface feature (e.g. user interface callout) may be presented that displays additional content associated with a data object.

As an example, an applications/service may be configured to provide a representation of a data object that includes some but not all content associated with the data object, where a full representation of the data object may be presented for the user based on a subsequently received action. In some examples, a user interface of an application/service may be configured to enable conversion and/or recovery of a data object to a different state. For instance, a user may hover over a representation of the data object (e.g. within the composite data object) and a user interface feature may be presented to enable recovery of a converted data object to a previous form. In one example, an electronic contact card may be presented as an image or email address and the user may be able to recover the full rich data format of the electronic contact card.

Accordingly, the present disclosure provides a plurality of technical advantages, among other examples, that include but not limited to: automatic generation of a composite data object that generates representation of a data objects for a specific context, content mobility for composite data objects across different content portions and/or applications/services, improved processing efficiency (e.g. reduction in processing cycles, reduction in latency, better management of storage/memory of computing devices) for computing devices that are utilized for generating and managing composite data objects and representations of data objects for different contexts, generation and utilization of an exemplary processing model that is usable by and scalable with any type of productivity service to implement processing operations described herein, and improved user interaction and productivity with front-end user interfaces when using exemplary applications/services, for example, where an exemplary productivity application/service may be configured to implement functionality described herein to enhance the user interface and improve user interaction with the productivity application/service.

FIG. 1 illustrates an exemplary method 100 related to transformation of a data object for a context of digital document with which aspects of the present disclosure may be practiced. As an example, method 100 may be executed by an exemplary processing device and/or system such as those shown in FIGS. 3-5. In examples, method 100 may execute on a device comprising at least one processor configured to store and execute operations, programs or instructions. Operations performed in method 100 may correspond to operations executed by a system and/or service that execute computer programs, application programming interfaces (APIs), neural networks or machine-learning processing and semantic and entity understanding modeling, among other examples. As an example, processing operations executed in method 100 may be performed by one or more hardware components. In another example, processing operations executed in method 100 may be performed by one or more software components. In some examples, processing operations described in method 100 may be executed by one or more applications/services associated with a web service that has access to a plurality of application/services, devices, knowledge resources, etc. Processing operations described in method 100 may be implemented by one or more components connected over a distributed network.

Method 100 begins at processing operation 102, where an action/actions, such as a drag and drop, is received through a user interface of a productivity service. Examples described herein pertain to action received through a computing device, which may be received through a user interface of an application/service. Examples of actions comprise but are not limited to: drag and drop actions, copy and paste actions, selection actions, voice command operations, handwritten input operations, among other examples. For ease of explanation and understanding, examples for drag and drop action actions are subsequently provided herein but are intended to be representative of other types of actions as well.

An exemplary productivity application/service is an application/service configured for execution to enable users to complete tasks on a computing device. Examples of productivity services comprise but are not limited to: word processing applications/services, spreadsheet applications/services, notes/notetaking applications/services, authoring applications/services, digital presentation applications/services, search engine applications/services, email applications/services, messaging applications/services, web browsing applications/services, collaborative team applications/services, directory applications/services, mapping services, calendaring services, electronic payment services, digital storage applications/services and social networking applications/services, among other examples. In some examples, an exemplary productivity application/service may be a component of a suite of productivity applications/services that may be configured to interface with other applications/services associated with a platform. For example, a word processing service may be included in a bundled service (e.g. Microsoft® Office365® or the like). Further, an exemplary productivity service may be configured to interface with other internet sources/services including third-party application/services, for example, to enhance functionality of the productivity service.

An exemplary drag and drop, received in processing operation 102, may drag and drop a data object (or objects) onto a content portion (or portions) of a digital document. As an example, an exemplary data object may be a complex data object. An exemplary complex data object comprises two or more data field entries in a rich data format. For instance, examples of complex data objects comprise but are not limited to: electronic contact cards, profiles (e.g. user, business, locations, etc.), grouped/layered objects, etc. Exemplary complex data objects may further comprise data types such as hyperlinks, handwritten input data voice/audio data, and video data, among other examples. Complex data objects may be convertible between rich format representations and flat representations. While an initial representation of a data object may be fit for a context of a digital document, a user interface of the productivity service may be configured to enable users to access different forms for a data object (e.g. quickly transform the complex data object to a different state/recover an original state).

A digital document may comprise but is not limited to: an electronic file, website, social networking post, word documents, notes, documents, spreadsheet documents, blogs, etc. In one example, processing operation 102 may comprise a drag and drop that drags a data object from digital document of a productivity service and drops that data object on another content portion of that digital document. In another example, processing operation 102 may comprise a drag and drop that drags content from a first digital document (e.g. associated with an application/service) to a second digital document (that may be associated with another application/service).

Flow of method 100 may proceed to processing operation 104, where a context for the action(s) is determined. An exemplary context is data indicating a current processing state (e.g. current context) based on: a data object that is being dragged onto a content portion of a digital document, the digital document that is receiving the data object and relationships therebetween. Data associated with the content portion can include the specific area where the content is dropped (e.g. understanding the surrounding paragraph or semantics of a table), the type of document (e.g. resume, bid document), the location of the document, work vs. personal, and pattern of use (e.g. signal processing evaluating user behaviors), among other examples. The most appropriate layout and formatting may be chosen based on the context of the processing action. For instance, contextual analysis of an action (and associated data) may yield a determination to manipulate a data object between a rich data representation and a flat data representation. Data associated with the content portion can include the specific area where the content is dropped (e.g. understanding the surrounding paragraph or semantics of a table), the type of document (e.g. resume, bid document), the location of the document, work vs. personal, and pattern of use (e.g. signal processing evaluating user behaviors), among other examples.

For instance, a determination of context of an exemplary action may be configured to identify an intent for specific action. Determination of a context may comprise execution of semantic analysis of the action based on application of one or more of: a software-based model, machine-learning model, neural network model, entity data model or the like. Types of data models and processing operations for generation and implementation of exemplary data models are known to one skilled in the art. Modeling related to feature selection and ranking/scoring of features for final determination of a context is also known to one skilled in the field of art.

In one example, an exemplary model may be an entity model that evaluates semantic structure of content (e.g. data objects and content portions) associated with an exemplary action. An exemplary entity model may interface with one or more databases, knowledge repositories, etc., which manages entity data and a mapping of relationships for entity data, among other types of information (e.g. data models or knowledge graph, for example, that are accessible via service examples). Identification of specific entity data and relationships between data objects/content portions may be utilized for generation of an exemplary composite data object. An exemplary composite data object may comprise a content portion of the digital document (e.g. a first data object) and the representation of the data object that is being dragged onto the content portion. In many examples, an exemplary representation of a data object, that is included in a composite data object, may alter formatting and layout of the data object to best fit a state of the content portion of the digital document.

In another example, an exemplary model may be rule-based, where rules may be set to evaluate an exemplary action and generate inferences that define a current context. Generated inferences may be utilized by an exemplary model to generate composite data objects, based on the determined context, that comprise a representation of a data object that is being dragged onto a content portion of a digital document. As an example, inference rules may be set based on entity analysis of data objects, content portions, digital documents, etc., that are involved with an action.

In yet another example, an exemplary model may be a template-based model that is trained to identify patterns from a determined context to generate a best representation of a data object for inclusion within a content portion of a digital document. As an example, processing operations for a template-based model may match data attributes, associated with content involved in an exemplary action, to determine a context for an action and generate an exemplary composite data object. For instance, a template-based model may be trained based on signal data collected from training and/or previous user interactions (e.g. individual user or group of users). One or more templates may be set that correspond to results of evaluation of data attributes. Different templates may be set for a data object that are used for generation of an exemplary composite data object, where a template of the different templates may be selected based on evaluation of the data attributes associated with the action. For instance, a first template may be associated with a representation of a data object when the action inserts the data object in multiple columns/rows of an electronic table and a second template may be utilized when the data object when the action inserts the data object in paragraph portion of a digital document.

In other examples, an exemplary model may be an aggregate model that analyzes an exemplary action from any of the perspectives identified above (e.g. rule/inference based processing, entity evaluation and template-based matching). As an example, an exemplary aggregate model may be configured to simultaneously run processing of different models to determine the context, where results data may be pooled and utilize to determine the context. In another example, parameters or inputs to a model for the exemplary action may be specifically selected from different models based on applicability.

As referenced above, processing operations may be executed that perform semantic analysis of an exemplary action. For instance, data and metadata associated with data objects/content portions involved in an action may be analyzed. In doing so, an exemplary model may be configured to analyze attributes (e.g. origin, file format, content, layout of content, formatting, time, place, theme, metadata, etc.) of the data objects/content portions involved in the action. Semantic analysis further comprises evaluation of relationships (similarities, differences, locational/placement data, presentation styles for merging the data objects including various arrangements for content of data objects, etc.) between data objects/content portions of the action. Other attributes that may be evaluated during semantic analysis comprise: original locations of content, entity types (e.g. map, contact card, etc.). Further non-limiting examples of semantic analysis are provided.

For example, semantic analysis may identify data types that are involved in the action and identify relationships between the data objects. In one example, semantic analysis may yield a determination that a text object is being added to another type of data object (e.g. image, video, handwritten input, link, representation of audio file, etc.). Semantic analysis of may comprise region detection processing for recognition of placement options for the text and select N or more positions for placement of the text data object. In one example, a highest ranked position (e.g. estimated best position) may be automatically selected based on a comprehensive analysis of the different attributes associated with a drag and drop action. In yet another example, an inference may be made to add a text data object as a caption under or on the side of another type of data object (e.g. image), among other examples. While text objects are referenced in the foregoing examples, it should be understood that semantic processing as described herein may extend to any types of data objects.

In further examples, semantic analysis may evaluate data attributes of data objects that pertain to groupings, layers, etc., where such characteristics of data objects may assist with generation of a representation of a data object for insertion within a content portion of a digital document. For instance, semantic analysis may yield a determination identifying that a number of items (e.g. bullets) in one object matches the number of items in another object or a group of objects (e.g. pictures). Such data may be useful for generation of a representation of the data object (in a composite data object), where an initial item (of the listing) is used in a meaningful way, like as labels, captions, or associated text, for another item.

In another example, semantic analysis may comprise evaluation of locational placement of data objects, for example, coordinates pertaining to size and positioning of specific data objects relative to other data objects. In one example, X-Y data is used to capture location of a data object, where such captured information is further utilized to generate inferences proposing relevant visualization/layout for a data object (e.g. relative to another data object). Such inferences may be utilized for generation of a representation of the data object when being combined with a content portion of a digital document. For example, semantic analysis may yield a determination that an electronic contact card is being placed on an electronic map, where a determination is made to identify an address of the electronic contact card as a pinpoint on a map.

Further, as identified above, semantic analysis of an action may yield determinations related to intent of the action. Relationships between data objects may be utilized to identify an intent for an action. For instance, an intent may be inferred based on identification of the different data objects and a positional placement of a data object on a specific location of a content portion. In one example, semantic analysis of a drag and drop action may yield contextual determinations that an electronic contact card is being placed in a single cell of an electronic table (of a digital document), where the single cell is being used to identify an owner of a company. Such context may enable an exemplary model to determine a most appropriate initial representation of the data object, how to merge the data object (e.g. electronic contact card) with the content portion (e.g. electronic table) and even how to present other representations of the data object (e.g. a more complete visual representation when a user selects the representation of the electronic contact card, hovers-over the electronic contact card, etc.). For instance, semantic evaluation of an action(s) (e.g. context of the action) may yield a determination to autofill multiple portions of a digital document (e.g. fill an entire row/column of an electronic table). Analysis of a content portion may yield determinations that several fields in a content portion are semantically related to data fields in a data object, where the fields of the content portion can be filled out simultaneously without additional user interaction.

A determination of intent may further comprise selecting intent based on an evaluation of data pertaining to previous user behavior for grouping of the first data object and the second data object. This may indicate patterns of user behavior, where patterns may be evaluated on an individual user level and/or aggregated to a group level (e.g. all users of an application/service). In examples, a determination of intent may further comprise evaluation as to whether a drag and drop action (and/or additional actions by the user) corresponds to a special meaning. An exemplary application/service may be programmed to recognize user actions (including combinations of actions) as corresponding to a specific intent. For example, dragging text over a group of images (showing individual people) and moving the text above one of the images might associate that text with that specific image and offer to use as a caption for that specific image.

Moreover, semantic evaluation of an exemplary action/actions may further be configured with a default fallback for insertion behavior. An exemplary model may be configured to collect and evaluate signal data to determine an exemplary context of an action. In some cases, signal data indicating specifics of a context for a digital document may be unavailable or not enough data is collected to make a proper determination. In such instances, an exemplary model may be configured to determine how to modify a data object based on broader trends (e.g. document name, location, previous usage patterns of user and/or aggregate users, etc.). An exemplary model applied for semantic analysis of an action may be programmable (by developers) as well as adaptable (learning model), where the model may learn from signal data collected.

Flow may proceed to processing operation 106, where a composite data object is generated based on the determined context of the analyzed action(s) (e.g. drag and drop). As referenced above, the composite data object comprises the content portion and a representation of the complex data object that alters presentation of the complex data object. Generation (processing operation 106) of an exemplary composite data object comprises adjusting a data object for placement within a specific content portion of a digital document. That is, a representation of a data object (e.g. that is being dragged and dropped onto a content portion) is generated, where the representation of the data object is a component of the composite data object. Processing operation 106 may be configured to arrange content, layout and formatting of a data object based on analysis of a context associated with a processing action.

Generation of the representation of the data object may comprise selection of specific content of the complex data object to surface in the representation of the composite data object. Signals collected and analyzed from the data object and a context of a digital document are utilized to determine a best representation of the data object for insertion into a digital document. For instance, a data object may be inserted into a specific portion of a digital document, where an exemplary composite data object may be created that tailors the data object for insertion into the content portion of the digital document based on results of the semantic analysis of the data object, the content portion and relationships therebetween. Specific content of the complex data object may be selected based on the determined context. For example, a data object may be an electronic contact card in a rich data format that comprises multiple different data fields and data objects associated with profile data (e.g. name data, email address, messaging user identification, phone number, job data, personal data, image content, hyperlink content, social networking data, etc.) Specific content may be selected that is most appropriate for a context of a content portion that is receiving the data object.

Further, generation of the representation of the data object may comprise selection of formatting and layout of the specific content. Formatting and layout for the specific content may be selected based on the determined context. As references above, a context is determined based on determinations yielded during semantic analysis of action(s) that includes evaluation of data objects, digital documents, and associated relationships. As an example, selection of the formatting and the layout for the specific content in the representation of the complex data object comprises one or more of: adding or removing rich content formatting for the complex data object, for example, based on the determined context. Furthermore, selection of formatting and layout may comprise modification of a format of the data object (e.g. text data changed to a pin location on a map), adjustment of a size of the data object, arrangement of content shown in the data object, manipulation of layering for the data object, grouping of content portions of the data object, modification of font and adding user interface features to enable expansion/reduction of data object, among other examples.

Transformation of the data object (as a representation) enables recovery and adjustment of inserted content/data objects, where rich data formats may be retained despite a representation of the data object where the layout and formatting has been visibly altered. The representation of the complex data object may be generated based on a selection of the specific content and a selection of the formatting and layout of the specific content. For example, a generated composite data object may comprise a first representation of a transferred data object that initially displays content that fits a context of the receiving application/service and a different composite data object may comprise a second representation of the transferred data object that alters the data object for a context associated with a different content portion/digital document, etc. Further, processing operation 106 may comprise merging the representation of the complex data object with the content portion (that is receiving the data object) to generate the composite data object.

Flow of method 100 may proceed to processing operation 108, where the composite data object is surfaced. As an example, a composite data object is surfaced through a user interface of the productivity application/service. As identified in the foregoing, an exemplary composite data object may comprise a content portion of the digital document (e.g. a first data object) and the representation of the data object that is being dragged onto the content portion. In many examples, an exemplary representation of a data object, that is included in a composite data object, may alter formatting and layout of the data object to best fit a state of the content portion of the digital document. Examples of an exemplary action (e.g. drag and drop) and exemplary composite data objects are illustrated in FIGS. 2A-2D.

Flow may of method 100 may proceed to decision operation 110, where it is determined whether an update is to occur to the composite data object surfaced through the user interface of the productivity application/service. A user may elect to modify the composite data object or execute an action that involves the composite data object. For instance, the modified representation of the data object (included as a component of the composite data object) may be dragged and dropped onto another content portion. In another example, a user may take further action (e.g. hover-over, scroll-over, selection, etc.) to reveal additional data associated with a portion of the composite data object. For example, a user interface feature (e.g. user interface callout) may be presented that displays additional content associated with a data object. As an example, applications/service may be configured to provide a representation of a data object that includes some but not all content associated with the data object, where a full representation of the data object may be presented for the user based on a subsequently received action.

In examples where no update occurs, flow of decision operation 110 branches NO and processing of method 100 remains idle until subsequent processing is to occur. In examples where decision operation 110 determines that update is to occur to the composite data object, flow of decision operation 110 branches YES and processing of method 100 returns back to processing operation 102 where action is received. In one example, a subsequent drag and drop action is received that drags the representation of the data object from the content portion and drops the representation of the complex data object onto a second content portion. In such a case determining a context for the second drag and drop action is determined and a new composite data object is generated based on the determined context of the second drag and drop action. The new composite data object may comprise the second content portion and a new representation of the data object. The new composite object may be surfaced, through a user interface of the productivity application/service (or another productivity application/service). Similar to the previous examples described herein, surfacing of the new composite data object alters presentation of the data object to align with a context for the second content portion.

FIGS. 2A-2D illustrate exemplary processing device views associated with transformation of a data object with which aspects of the present disclosure may be practiced. User interface examples are shown in association with exemplary productivity applications/services, where processing device views shown in FIGS. 2A-2D are front-end examples of processing operations described in method 100 (FIG. 1). Processing operations supporting the examples shown in FIGS. 2A-2G are described in the foregoing description of method 100 (FIG. 1).

FIG. 2A illustrates processing device view 200, providing a display of a user interface for an exemplary productivity application/service. Within processing device view 200, a digital document 202 (e.g. Data Analysis.doc) is presented within the user interface (UI) of the productivity application/service. Further, processing device view 200 highlights the inclusion of a content portion 204 (e.g. electronic table "Customer List") within the digital document 202. Moreover, processing device view 200 comprises an exemplary digital document collection 206, which may be a user interface features to identify content that is either in a digital document or retrievable to include within a digital document. The digital document collection 206 may comprise a search functionality that enables user to retrieve content to include within the digital document 202. In examples, content may be retrieved from any of a plurality of applications/services including those that are accessed via a network connection. In alternative examples, the digital document collection 206 may be a digital document from a different application/service (e.g. productivity service). As illustrated in processing device view 200, a drag and drop 208 occurs, where a data object (e.g. electronic contact card for Seth Bing) from the digital document collection 206 is being dragged and dropped on the content portion 204 of the digital document 202.

FIG. 2B illustrates processing device view 220, providing continued example of that shown in processing device view 200 (FIG. 2A). Processing device view 220 illustrates display of a user interface for an exemplary productivity application/service that comprises the digital document 202, the content portion 204, the digital document collection 206 and a result of the drag and 208. The result of the drag and drop is generated composite data object 222 that layers the electronic contact card (from the digital document collection 206) onto a cell of the content portion 204 (e.g. the Customer List electronic table). The composite data object 222 places a representation of the electronic contact card in a cell (of the electronic table) that corresponds with the end of the drag and drop action (e.g. where the cell corresponds to the "Owner" column). In some examples, the drag and drop 208 may comprise dragging the electronic contact card over multiple cells of the electronic table, where processing operations, described in the foregoing description, would recognize this as being intended to provide data of the electronic contact card across multiple cells. As previously described, semantic analysis of action may yield a determination to autofill multiple fields in a content portion. As can be seen in processing device view 220, the composite data object comprises an altered representation of the data object (e.g. electronic contact card from the digital document collection 206) where content, layout and format of the representation is altered to fit a context associated with the content portion 204.

FIG. 2C illustrates processing device view 240, providing continued example of that shown in processing device view 200 (FIG. 2A) and processing device view 220 (FIG. 2B). Processing device view 240 illustrates display of a user interface for an exemplary productivity application/service that comprises the digital document 202, the content portion 204, the digital document collection 206 and the generated composite data object 222. Processing device view 240 further illustrates the receipt of a subsequent action 242 that may hover-over, scroll-over, etc., the composite data object 222. Processing described herein may be configured to surface, through the user interface, a second representation of the data object 244, for example, that provides a more complete view of the electronic contact card. Like initial representations, subsequent representations, shown through the user interface, may vary according to a determined context. In some instances, a user may select a user interface feature of the data object to reveal additional data, receive suggestions, access related content (e.g. files, links, webpages, etc.). As an example, an applications/service may be configured to provide a representation of a data object that includes some but not all content associated with the data object, where a full representation of the data object may be presented for the user based on a subsequently received action. In some examples, a user interface of an application/service may be configured to enable conversion and/or recovery of a data object to a different state. For instance, a user may hover over a representation of the data object (e.g. within the composite data object) and a user interface feature may be presented to enable recovery of a converted data object to a previous form. In one example, an electronic contact card may be presented as an image or email address and the user may be able to recover the full rich data format of the electronic contact card.

FIG. 2D illustrates processing device view 260, providing continued example of that shown in processing device view 200 (FIG. 2A) and processing device view 220 (FIG. 2B). Processing device view 260 illustrates display of a user interface for an exemplary productivity application/service that comprises the digital document 202, the content portion 204, the digital document collection 206 and the generated composite data object 222. Processing device view 260 further illustrates the receipt of a subsequent action 264, that drags and drops data from the composite data object (e.g. the representation of the complex data object) onto a new content portion. As reference above, the new content portion may be a content portion of the digital document 202. Further the new content portion may be a content portion in the digital document collection 206 and/or another application/service. As illustrated in processing device view 260, a result of the drag and drop 264 creates a new composite data object 266, providing a representation of the complex data object 222 in a context that fits the new content portion. For example, the new composite data object 266 provides an electronic pin displayed over an electronic map, where processing may have yielded a determination that address data associated with the electronic contact card would be most appropriate to display in conjunction with the electronic map. Furthermore, exemplary productivity applications/services may be configured to utilize data associated with exemplary composite data objects to enhance functionality of the application/service. For instance, adding an electronic pin to an electronic map may further be accompanied by a user interface prompt for the user to seek directions to the address/location associated with the electronic contact card.

Figure 3:
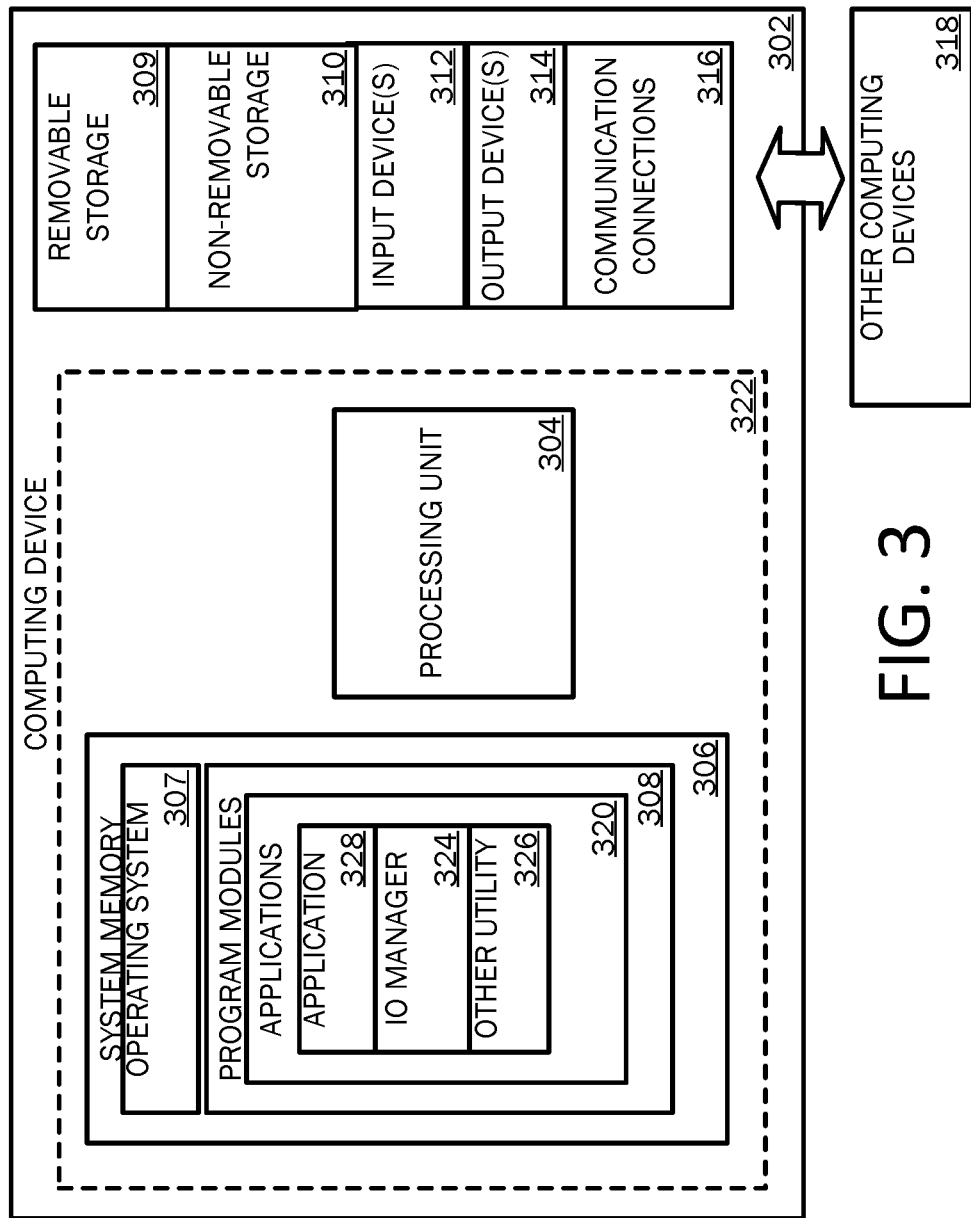
FIG. 3 is a block diagram illustrating an example of a computing device with which aspects of the present disclosure may be practiced.
Figure 4A:
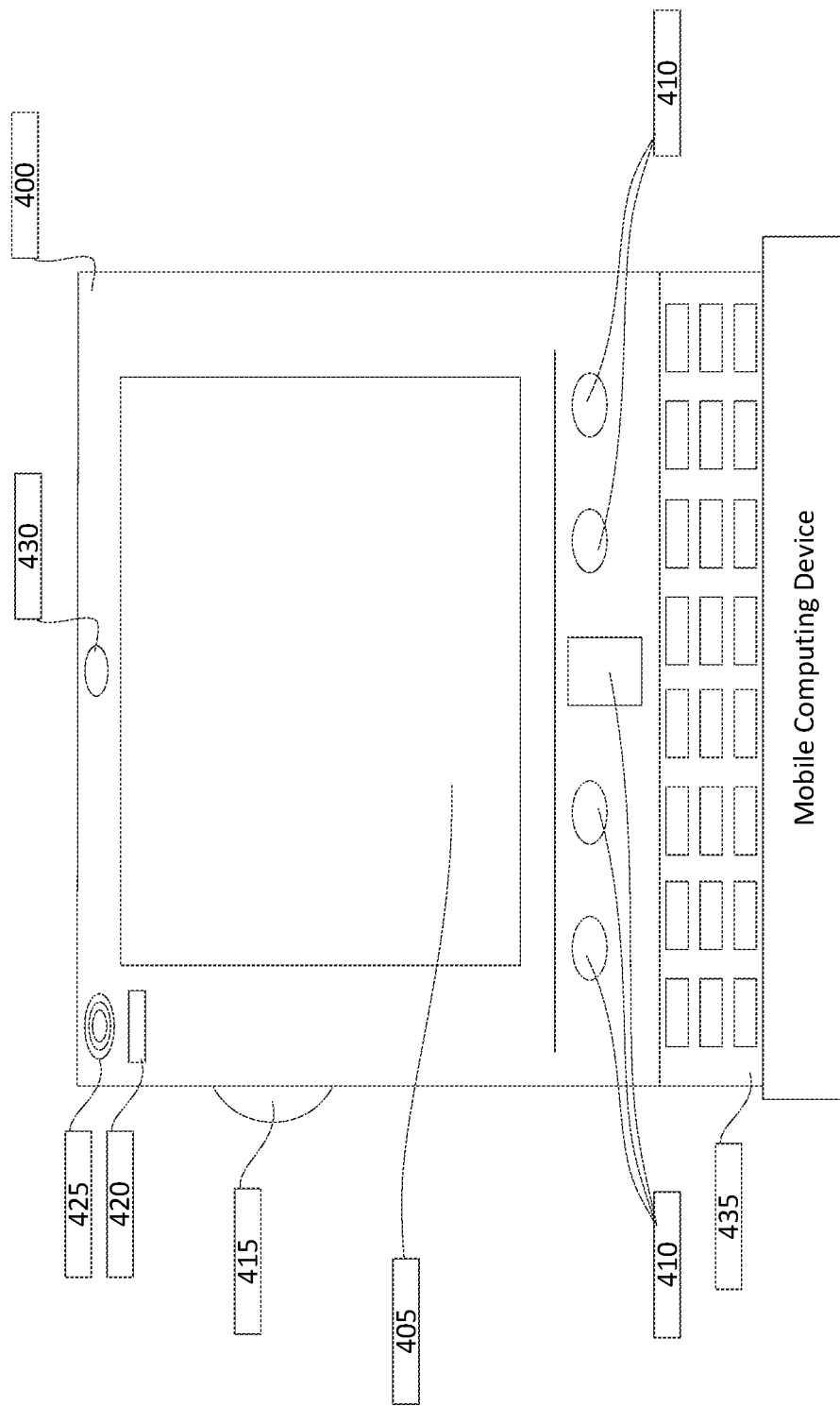
FIGS. 4A and 4B are simplified block diagrams of a mobile computing device with which aspects of the present disclosure may be practiced.
Figure 4B:
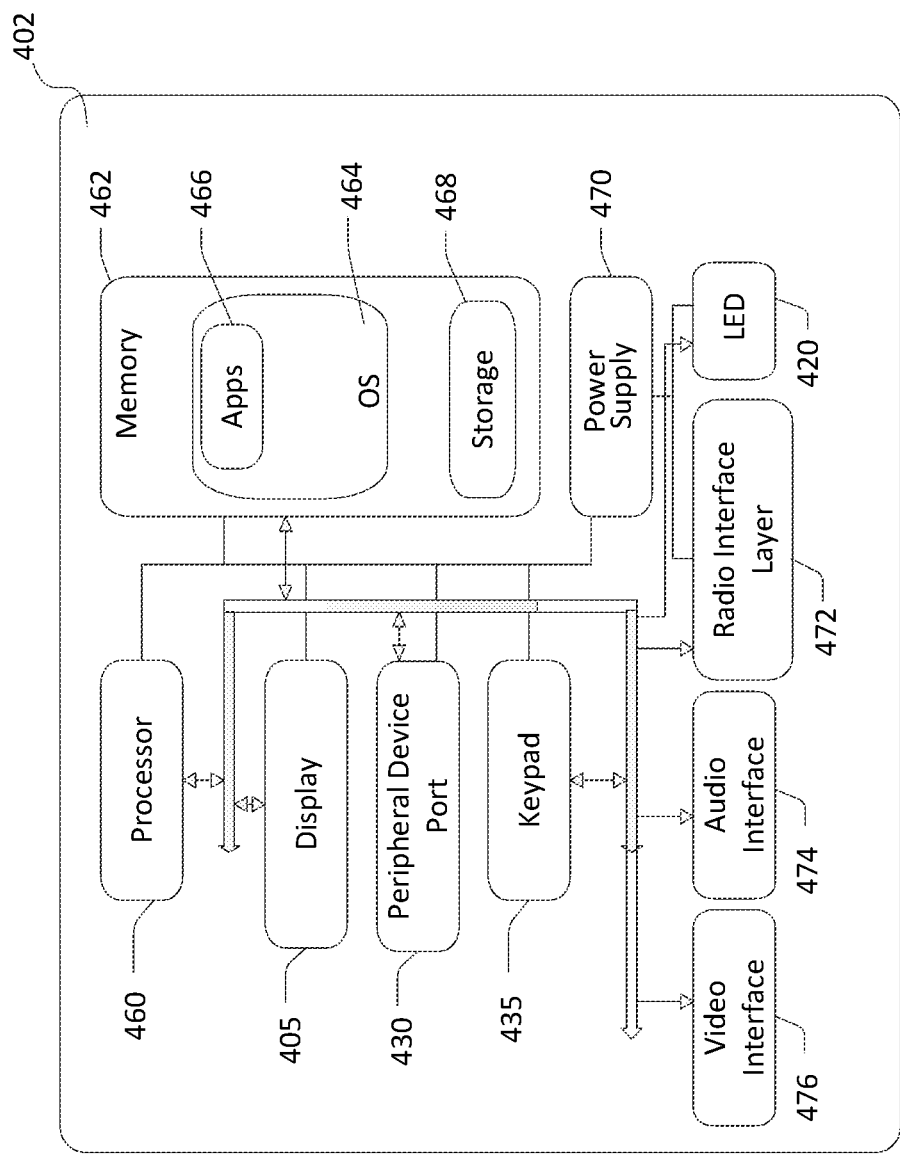
Figure 5:
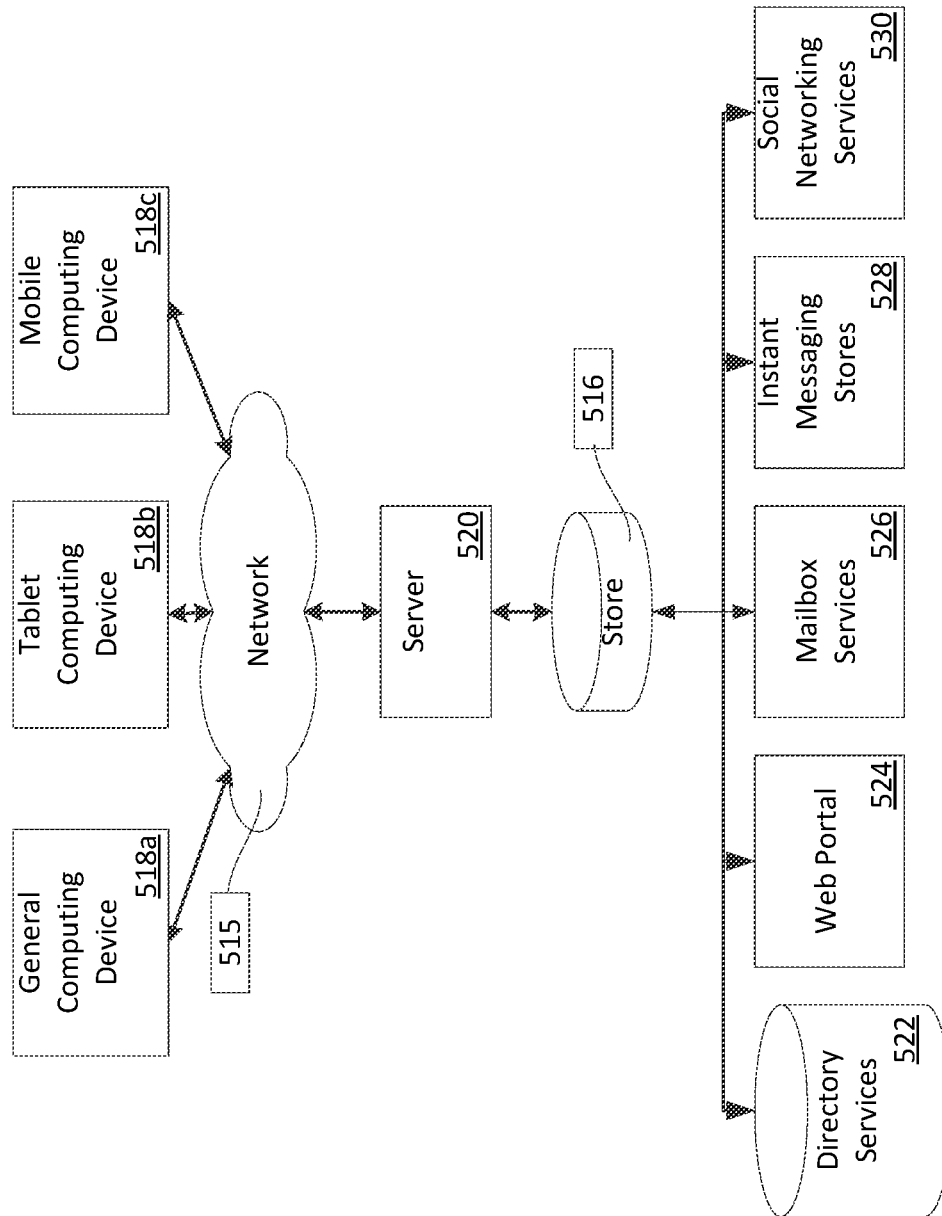
FIG. 5 is a simplified block diagram of a distributed computing system in which aspects of the present disclosure may be practiced.

FIGS. 3-5 and the associated descriptions provide a discussion of a variety of operating environments in which examples of the invention may be practiced. However, the devices and systems illustrated and discussed with respect to FIGS. 3-5 are for purposes of example and illustration and are not limiting of a vast number of computing device configurations that may be utilized for practicing examples of the invention, described herein.

FIG. 3 is a block diagram illustrating physical components of a computing device 302, for example a mobile processing device, with which examples of the present disclosure may be practiced. Among other examples, computing device 302 may be an exemplary computing device configured for contextual transformation of data objects as described herein. In a basic configuration, the computing device 302 may include at least one processing unit 304 and a system memory 306. Depending on the configuration and type of computing device, the system memory 306 may comprise, but is not limited to, volatile storage (e.g., random access memory), non-volatile storage (e.g., read-only memory), flash memory, or any combination of such memories. The system memory 306 may include an operating system 307 and one or more program modules 308 suitable for running software programs/modules 320 such as IO manager 324, other utility 326 and application 328. As examples, system memory 306 may store instructions for execution. Other examples of system memory 306 may store data associated with applications. The operating system 307, for example, may be suitable for controlling the operation of the computing device 302. Furthermore, examples of the invention may be practiced in conjunction with a graphics library, other operating systems, or any other application program and is not limited to any particular application or system. This basic configuration is illustrated in FIG. 3 by those components within a dashed line 322. The computing device 302 may have additional features or functionality. For example, the computing device 302 may also include additional data storage devices (removable and/or non-removable) such as, for example, magnetic disks, optical disks, or tape. Such additional storage is illustrated in FIG. 3 by a removable storage device 309 and a non-removable storage device 310.

As stated above, a number of program modules and data files may be stored in the system memory 306. While executing on the processing unit 304, program modules 308 (e.g., Input/Output (I/O) manager 324, other utility 326 and application 328) may perform processes including, but not limited to, one or more of the stages of the operations described throughout this disclosure. Other program modules that may be used in accordance with examples of the present invention may include electronic mail and contacts applications, word processing applications, spreadsheet applications, database applications, slide presentation applications, drawing or computer-aided application programs, photo editing applications, authoring applications, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 3 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the computing device 402 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

The computing device 302 may also have one or more input device(s) 312 such as a keyboard, a mouse, a pen, a sound input device, a device for voice input/recognition, a touch input device, etc. The output device(s) 314 such as a display, speakers, a printer, etc. may also be included. The aforementioned devices are examples and others may be used. The computing device 302 may include one or more communication connections 316 allowing communications with other computing devices 318. Examples of suitable communication connections 316 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 306, the removable storage device 309, and the non-removable storage device 310 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 302. Any such computer storage media may be part of the computing device 302. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 4A and 4B illustrate a mobile computing device 400, for example, a mobile telephone, a smart phone, a personal data assistant, a tablet personal computer, a phablet, a slate, a laptop computer, and the like, with which examples of the invention may be practiced. Mobile computing device 400 may be an exemplary computing device configured for contextual transformation of data objects as described herein. Application command control may be provided for applications executing on a computing device such as mobile computing device 400. Application command control relates to presentation and control of commands for use with an application through a user interface (UI) or graphical user interface (GUI). In one example, application command controls may be programmed specifically to work with a single application. In other examples, application command controls may be programmed to work across more than one application. With reference to FIG. 4A, one example of a mobile computing device 400 for implementing the examples is illustrated. In a basic configuration, the mobile computing device 400 is a handheld computer having both input elements and output elements. The mobile computing device 400 typically includes a display 405 and one or more input buttons 410 that allow the user to enter information into the mobile computing device 400. The display 405 of the mobile computing device 400 may also function as an input device (e.g., touch screen display). If included, an optional side input element 415 allows further user input. The side input element 415 may be a rotary switch, a button, or any other type of manual input element. In alternative examples, mobile computing device 400 may incorporate more or less input elements. For example, the display 405 may not be a touch screen in some examples. In yet another alternative example, the mobile computing device 400 is a portable phone system, such as a cellular phone. The mobile computing device 400 may also include an optional keypad 435. Optional keypad 435 may be a physical keypad or a "soft" keypad generated on the touch screen display or any other soft input panel (SIP). In various examples, the output elements include the display 405 for showing a GUI, a visual indicator 420 (e.g., a light emitting diode), and/or an audio transducer 425 (e.g., a speaker). In some examples, the mobile computing device 400 incorporates a vibration transducer for providing the user with tactile feedback. In yet another example, the mobile computing device 400 incorporates input and/or output ports, such as an audio input (e.g., a microphone jack), an audio output (e.g., a headphone jack), and a video output (e.g., a HDMI port) for sending signals to or receiving signals from an external device.

FIG. 4B is a block diagram illustrating the architecture of one example of a mobile computing device. That is, the mobile computing device 400 can incorporate a system (i.e., an architecture) 402 to implement some examples. In one examples, the system 402 is implemented as a "smart phone" capable of running one or more applications (e.g., browser, e-mail, calendaring, contact managers, messaging clients, games, and media clients/players). In some examples, the system 402 is integrated as a computing device, such as an integrated personal digital assistant (PDA), tablet and wireless phone.

One or more application programs 466 may be loaded into the memory 462 and run on or in association with the operating system 464. Examples of the application programs include phone dialer programs, e-mail programs, personal information management (PIM) programs, word processing programs, spreadsheet programs, Internet browser programs, messaging programs, and so forth. The system 402 also includes a non-volatile storage area 468 within the memory 462. The non-volatile storage area 468 may be used to store persistent information that should not be lost if the system 402 is powered down. The application programs 466 may use and store information in the non-volatile storage area 468, such as e-mail or other messages used by an e-mail application, and the like. A synchronization application (not shown) also resides on the system 402 and is programmed to interact with a corresponding synchronization application resident on a host computer to keep the information stored in the non-volatile storage area 468 synchronized with corresponding information stored at the host computer. As should be appreciated, other applications may be loaded into the memory 462 and run on the mobile computing device (e.g. system 402) described herein.

The system 402 has a power supply 470, which may be implemented as one or more batteries. The power supply 470 might further include an external power source, such as an AC adapter or a powered docking cradle that supplements or recharges the batteries.

The system 402 may include peripheral device port 430 that performs the function of facilitating connectivity between system 402 and one or more peripheral devices. Transmissions to and from the peripheral device port 430 are conducted under control of the operating system (OS) 464. In other words, communications received by the peripheral device port 430 may be disseminated to the application programs 466 via the operating system 464, and vice versa.

The system 402 may also include a radio interface layer 472 that performs the function of transmitting and receiving radio frequency communications. The radio interface layer 472 facilitates wireless connectivity between the system 402 and the "outside world," via a communications carrier or service provider. Transmissions to and from the radio interface layer 472 are conducted under control of the operating system 464. In other words, communications received by the radio interface layer 472 may be disseminated to the application programs 566 via the operating system 464, and vice versa.

The visual indicator 420 may be used to provide visual notifications, and/or an audio interface 474 may be used for producing audible notifications via the audio transducer 425 (as described in the description of mobile computing device 400). In the illustrated example, the visual indicator 420 is a light emitting diode (LED) and the audio transducer 425 is a speaker. These devices may be directly coupled to the power supply 470 so that when activated, they remain on for a duration dictated by the notification mechanism even though the processor 460 and other components might shut down for conserving battery power. The LED may be programmed to remain on indefinitely until the user takes action to indicate the powered-on status of the device. The audio interface 474 is used to provide audible signals to and receive audible signals from the user. For example, in addition to being coupled to the audio transducer 425 (shown in FIG. 4A), the audio interface 474 may also be coupled to a microphone to receive audible input, such as to facilitate a telephone conversation. In accordance with examples of the present invention, the microphone may also serve as an audio sensor to facilitate control of notifications, as will be described below. The system 402 may further include a video interface 476 that enables an operation of an on-board camera 430 to record still images, video stream, and the like.

A mobile computing device 400 implementing the system 402 may have additional features or functionality. For example, the mobile computing device 400 may also include additional data storage devices (removable and/or non-removable) such as, magnetic disks, optical disks, or tape. Such additional storage is illustrated in FIG. 4B by the non-volatile storage area 468.

Data/information generated or captured by the mobile computing device 400 and stored via the system 402 may be stored locally on the mobile computing device 400, as described above, or the data may be stored on any number of storage media that may be accessed by the device via the radio 472 or via a wired connection between the mobile computing device 400 and a separate computing device associated with the mobile computing device 400, for example, a server computer in a distributed computing network, such as the Internet. As should be appreciated such data/information may be accessed via the mobile computing device 400 via the radio 472 or via a distributed computing network. Similarly, such data/information may be readily transferred between computing devices for storage and use according to well-known data/information transfer and storage means, including electronic mail and collaborative data/information sharing systems.

FIG. 5 illustrates one example of the architecture of a system for providing an application that reliably accesses target data on a storage system and handles communication failures to one or more client devices, as described above. The system of FIG. 5 may be an exemplary system configured for contextual transformation of data objects as described herein. Target data accessed, interacted with, or edited in association with programming modules 308 and/or applications 320 and storage/memory (described in FIG. 3) may be stored in different communication channels or other storage types. For example, various documents may be stored using a directory service 522, a web portal 524, a mailbox service 526, an instant messaging store 528, or a social networking site 530, IO manager 324, other utility 326, application 328 and storage systems may use any of these types of systems or the like for enabling data utilization, as described herein. A server 520 may provide storage system for use by a client operating on general computing device 302 and mobile device(s) 400 through network 515. By way of example, network 515 may comprise the Internet or any other type of local or wide area network, and a client node may be implemented for connecting to network 515. Examples of a client node comprise but are not limited to: a computing device 302 embodied in a personal computer, a tablet computing device, and/or by a mobile computing device 400 (e.g., mobile processing device). As an example, a client node may connect to the network 515 using a wireless network connection (e.g. WiFi connection, Bluetooth, etc.). However, examples described herein may also extend to connecting to network 515 via a hardwire connection. Any of these examples of the client computing device 302 or 400 may obtain content from the store 516.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A method comprising:
   receiving, through a user interface of a productivity service, a drag and drop that drags a complex data object onto a content portion of a digital document, wherein the complex data object is an interactive data object that comprises two or more hyperlink data fields;
   determining a context for the drag and drop based on an application of a trained model that is configured to execute semantic analysis on the drag and drop, wherein the semantic analysis comprises:
   a correlation evaluation of an entity data type of the content portion with the two or more hyperlink data fields of the complex data object and
   a selection of a modification of a visual state of the complex data object based on a result of the correlation evaluation identifying a contextual relationship between the entity data type of the content portion and at least one hyperlink data field of the complex data object, wherein the modification of the visual state of the complex data object changes a visual presentation of the at least one hyperlink data field;
   generating the composite data object that combines the content portion and the modification of the visual state of the complex data object in an aggregate representation based on a result of the semantic analysis executed by the trained model; and
   surfacing, through the user interface of the productivity service, the composite data object.

2. The method of claim 1, further comprising: receiving, through the user interface, a user interaction with the aggregate representation that comprises an action selected from a group consisting of: a hover action over the aggregate representation and a drag action of the aggregate representation; and displaying, through the user interface a user interface callout that presents additional content for the aggregate representation.

3. A system comprising:
   at least one processor; and
   a memory, operatively connected with the at least one processor, storing computer-executable instructions that, when executed by the at least one processor, causes the at least one processor to execute a method that comprises:
   receiving, through a user interface of a productivity service, a drag and drop that drags a complex data object onto a content portion of a digital document, wherein the complex data object is an interactive data object that comprises two or more hyperlink data fields;

determining a context for the drag and drop based on an application of a trained model that is configured to execute semantic analysis on the drag and drop, wherein the semantic analysis comprises:

a correlation evaluation of an entity data type of the content portion with the two or more hyperlink data fields of the complex data object and a selection of a modification of a visual state of the complex data object based on a result of the correlation evaluation identifying a contextual relationship between the entity data type of the content portion and at least one hyperlink data field of the complex data object, wherein the modification of the visual state of the complex data object changes a visual presentation of the at least one hyperlink data field;

generating the composite data object that combines the content portion and the modification of the visual state of the complex data object in an aggregate representation based on a result of the semantic analysis executed by the trained model; and surfacing, through the user interface of the productivity service, the composite data object.

4. The system of claim 3, wherein the method, executed by the at least one processor, further comprises: receiving, through the user interface, a user interaction with the aggregate representation that comprises an action selected from a group consisting of: a hover action over the aggregate representation and a drag action of the aggregate representation; and displaying, through the user interface a user interface callout that presents additional content for the aggregate representation.

5. A computer-readable storage medium storing computer-executable instructions that, when executed by at least one processor, causes the at least one processor to execute a method comprising:

receiving, through a user interface of a productivity service, a drag and drop that drags a complex data object onto a content portion of a digital document, wherein the complex data object is an interactive data object that comprises two or more hyperlink data fields;

determining a context for the drag and drop based on an application of a trained model that is configured to execute semantic analysis on the drag and drop, wherein the semantic analysis comprises:

a correlation evaluation of an entity data type of the content portion with the two or more hyperlink data fields of the complex data object and a selection of a modification of a visual state of the complex data object based on a result of the correlation evaluation identifying a contextual relationship between the entity data type of the content portion and at least one hyperlink data field of the complex data object, wherein the modification of the visual state of the complex data object changes a visual presentation of the at least one hyperlink data field;

generating the composite data object that combines the content portion and the modification of the visual state of the complex data object in an aggregate representation based on a result of the semantic analysis executed by the trained model; and surfacing, through the user interface of the productivity service, the composite data object.

6. The computer-readable storage medium of claim 5, wherein the executed method further comprising: receiving, through the user interface, a user interaction with the aggregate representation that comprises an action selected from a group consisting of: a hover action over the aggregate representation and a drag action of the aggregate representation; and displaying, through the user interface a user interface callout that presents additional content for the aggregate representation.

7. The method of claim 1, further comprising: receiving, through the user interface of the productivity service, a scroll-over action over the composite data object in the aggregate representation; and in response to receipt of the scroll-over action, presenting an original representation of the complex data object that reflects a state of the complex data object prior to inclusion of the complex data object in the aggregate representation.

8. The method of claim 1, wherein the complex data object is an electronic contact card for a user, wherein the composite data object alters state of the electronic contact card to fit a context of the content portion, wherein the surfacing comprises presenting, through the user interface as part of the composite data object, a selectable user interface feature as the aggregate representation of the complex data object, and wherein the method further comprising: receiving a selection of the selectable user interface feature; and presenting, through the user interface, a full version of the electronic contact card.

9. The system of claim 3, wherein the method, executed by the at least one processor, further comprises: receiving, through the user interface of the productivity service, a scroll-over action over the composite data object in the aggregate representation; and in response to receipt of the scroll-over action, presenting an original representation of the complex data object that reflects a state of the complex data object prior to inclusion of the complex data object in the aggregate representation.

10. The system of claim 3, wherein the complex data object is an electronic contact card for a user, wherein the composite data object alters state of the electronic contact card to fit a context of the content portion, wherein the surfacing comprises presenting, through the user interface as part of the composite data object, a selectable user interface feature as the aggregate representation of the complex data object, and wherein the method further comprising: receiving a selection of the selectable user interface feature; and presenting, through the user interface, a full version of the electronic contact card.

11. The computer-readable storage medium of claim 5, wherein the executed method further comprising: receiving, through the user interface of the productivity service, a scroll-over action over the composite data object in the aggregate representation; and in response to receipt of the scroll-over action, presenting an original representation of the complex data object that reflects a state of the complex data object prior to inclusion of the complex data object in the aggregate representation.

12. The computer-readable storage medium of claim 5, wherein the complex data object is an electronic contact card for a user, wherein the composite data object alters state of the electronic contact card to fit a context of the content portion, wherein the surfacing comprises presenting, through the user interface as part of the composite data object, a selectable user interface feature as the aggregate representation of the complex data object, and wherein the executed method further comprising: receiving a selection of the selectable user interface feature; and presenting, through the user interface, a full version of the electronic contact card.

13. The method of claim 1, wherein the selection of the modification of the visual state of the complex data object further occurs based on analysis of user-signal data indicating user preferences for grouping types of data objects including the entity data type of the content portion and an entity data type of the complex data object, and wherein the analysis of the user-signal data occurs based on the application of the trained model.

14. The method of claim 1, wherein the selection of the modification of the visual state of the complex data object comprises: selecting a user interface element to represent the complex data object based on the entity data type of the content portion, and selecting data of the at least one hyperlink data field to present with the user interface element, and wherein the generating of the composite data object overlays, over the content portion, the user interface element and the data of the at least one hyperlink data field while hiding data associated with other hyperlink data fields of the complex data object.

15. The method of claim 1, wherein an execution of the semantic analysis further comprises a selection of a modification of a visual state of the content portion based on the result of the correlation evaluation identifying the contextual relationship between the entity data type of the content portion and at least one hyperlink data field of the complex data object, and wherein the generating of the composite data object generates the aggregate representation based on the selection of the modification of the visual state of the content portion and the selection of the modification of the visual state of the complex data object.

16. The system of claim 3, wherein the selection of the modification of the visual state of the complex data object further occurs based on analysis of user-signal data indicating user preferences for grouping types of data objects including the entity data type of the content portion and an entity data type of the complex data object, and wherein the analysis of the user-signal data occurs based on the application of the trained model.

17. The system of claim 3, wherein the selection of the modification of the visual state of the complex data object comprises: selecting a user interface element to represent the complex data object based on the entity data type of the content portion, and selecting data of the at least one hyperlink data field to present with the user interface element, and wherein the generating of the composite data object overlays, over the content portion, the user interface element and the data of the at least one hyperlink data field while hiding data associated with other hyperlink data fields of the complex data object.

18. The system of claim 3, wherein an execution of the semantic analysis further comprises a selection of a modification of a visual state of the content portion based on the result of the correlation evaluation identifying the contextual relationship between the entity data type of the content portion and at least one hyperlink data field of the complex data object, and wherein the generating of the composite data object generates the aggregate representation based on the selection of the modification of the visual state of the content portion and the selection of the modification of the visual state of the complex data object.

19. The computer-readable storage medium of claim 5, wherein the selection of the modification of the visual state of the complex data object further occurs based on analysis of user-signal data indicating user preferences for grouping types of data objects including the entity data type of the content portion and an entity data type of the complex data object, and wherein the analysis of the user-signal data occurs based on the application of the trained model.

20. The computer-readable storage medium of claim 5, wherein the selection of the modification of the visual state of the complex data object comprises: selecting a user interface element to represent the complex data object based on the entity data type of the content portion, and selecting data of the at least one hyperlink data field to present with the user interface element, and wherein the generating of the composite data object overlays, over the content portion, the user interface element and the data of the at least one hyperlink data field while hiding data associated with other hyperlink data fields of the complex data object.

* * * * *